A. B. Simonds,
Chisel.
No. 74,437.     Patented Feb. 11, 1868.
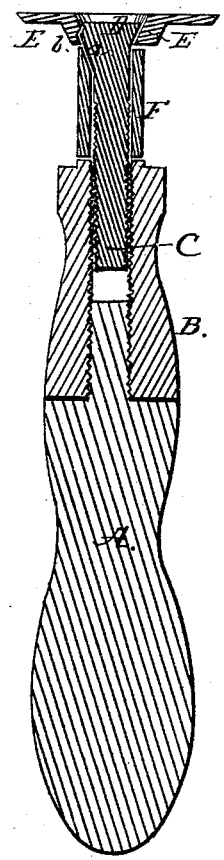

United States Patent Office.

AMOS B. SIMONDS, OF YOUNGSTOWN, OHIO.

*Letters Patent No. 74,437, dated February 11, 1868.*

---

IMPROVEMENT IN HAND-TURNING TOOL.

---

*The Schedule referred to in these Letters Patent and making part of the same.*

---

TO ALL WHOM IT MAY CONCERN:

Be it known that I, AMOS B. SIMONDS, of Youngstown, Mahoning county, Ohio, have invented a new and improved Chisel; and I do hereby declare that the following is a full, clear, and exact description thereof, which will enable others skilled in the art to make and use the same, reference being had to the accompanying drawing, forming part of this specification.

The present invention relates to an improved chisel or tool for turning the heads of bolts or other articles in connection with the turning of which hand-tools are used.

The tools or chisels heretofore used are made with solid shanks, and when the cutting-part is worn out the whole tool is destroyed and rendered useless; and the present invention consists in so attaching the cutter to the shank of the tool that it can be removed or detached therefrom when worn, and a new one applied, as will be hereinafter more particularly described, reference being had to the accompanying plate of drawings, in which the figure is a central section through the tool or chisel and its handle.

A, in the drawings, represents the handle to the tool, on one end of which is fixed, by screwing or otherwise, a hollow screw-threaded socket or shank, B. In this screw-socket B a bolt, C, is screwed, that at its outer end or head D has applied to it a cutter, E, which, by properly screwing in the said bolt C, is firmly held against a collar or sleeve, F, applied to the screw-bolt, between the cutter and the end of the screw-socket. The screw-bolt C is provided with a rib or projection, $a$, upon its sides, that fits within the notch $b$, upon the bore of the cutter and sleeve or collar F, and prevents the cutter from turning when used.

With the cutter or chisel secured to its holder in the manner above described, when worn, it can be detached therefrom and a new one substituted for it, the other portion or parts of the tool being still useful in lieu of useless, as with the mode of construction heretofore practised.

Having thus described my invention, what I claim as new, and desire to secure by Letters Patent, is—

The screw-bolt C, provided with a projection, $a$, in combination with the socket B, collar F, cutter E, and a handle, A, all constructed, arranged, and operating substantially as described and for the purpose specified.

AMOS B. SIMONDS.

Witnesses:
WARREN W. COWLES,
WILLIAM H. STEDMAN.